No. 708,393. Patented Sept. 2, 1902.
O. O. OZIAS.
WEIGHING AND PRICE SPRING BALANCE SCALE.
(Application filed Dec. 27, 1897.)
(No Model.) 3 Sheets—Sheet 1.

WITNESSES
K. E. Koehne
K. Jennis

INVENTOR
ORANGE O. OZIAS
BY
Male Koehne
Attorney

No. 708,393. Patented Sept. 2, 1902.
O. O. OZIAS.
WEIGHING AND PRICE SPRING BALANCE SCALE.
(Application filed Dec. 27, 1897.)
(No Model.) 3 Sheets—Sheet 2.
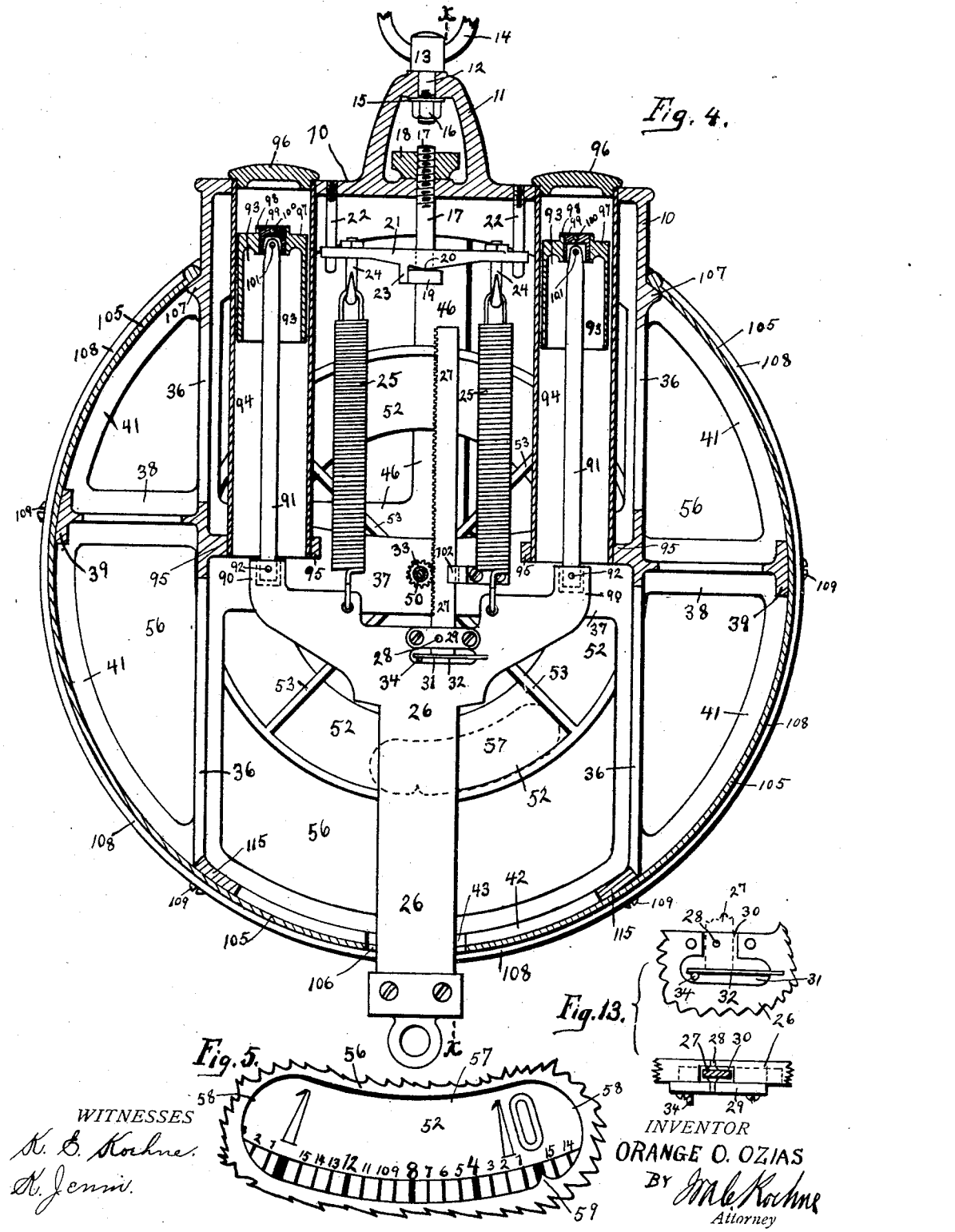
WITNESSES
INVENTOR
ORANGE O. OZIAS
By his Attorney

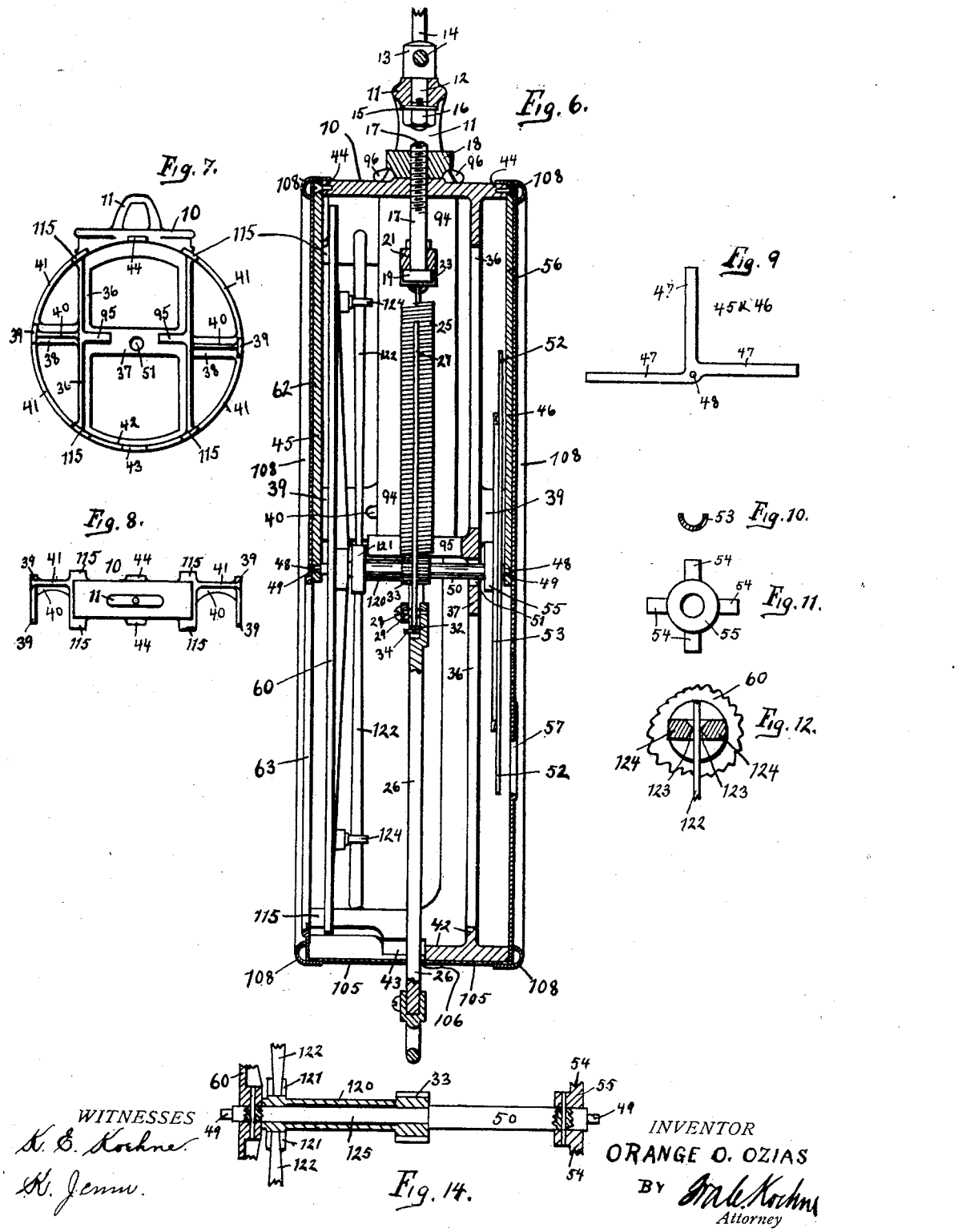

UNITED STATES PATENT OFFICE.

ORANGE O. OZIAS, OF DAYTON, OHIO, ASSIGNOR TO THE COMPUTING SCALE COMPANY, A CORPORATION OF OHIO.

WEIGHING AND PRICE SPRING-BALANCE SCALE.

SPECIFICATION forming part of Letters Patent No. 708,393, dated September 2, 1902.

Application filed December 27, 1897. Serial No. 663,789. (No model.)

*To all whom it may concern:*

Be it known that I, ORANGE O. OZIAS, a citizen of the United States, residing at Dayton, in the county of Montgomery and State of Ohio, have invented certain new and useful Improvements in Weighing and Price Spring-Balance Scales, of which the following is a specification, reference being had to the annexed drawings, forming a part hereof.

My present invention relates to improvements in computing-machines of the class known as "spring-balance price-scales," and has for its object the production of a simple, durable, and efficient scale which will quickly and readily indicate to the clerk the money value of the merchandise placed upon the scale and at the same time show the customer the weight in pounds and ounces, as well as to prevent undue vibrations of the several dials.

To this end the invention consists, essentially, of a frame, a shaft provided with bearings at its opposite ends in said frame, revoluble indicators mounted intermediate the ends of said shaft, a casing over said frame, exposing-openings in said casing for said indicators, and means for imparting a revoluble movement to said shaft proportionate to the gravity of the substance or merchandise, and, further, consists in the details of construction, arrangements, and combinations of the several parts, all as will hereinafter be more fully described, and particularly pointed out in the appended claims.

Figure 1:
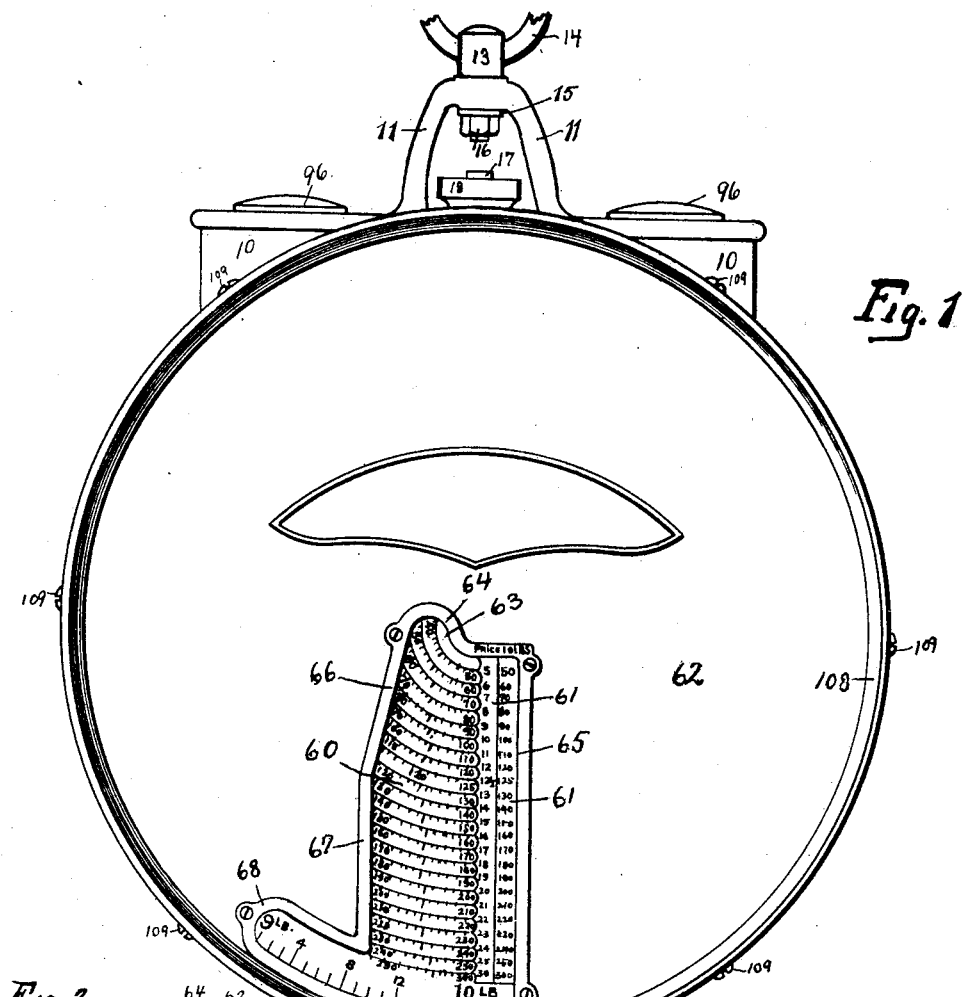
Figure 2:
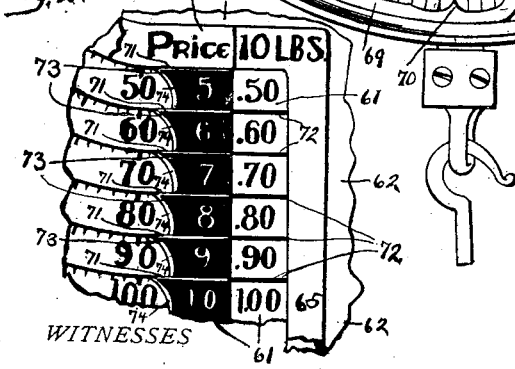
Figure 3:
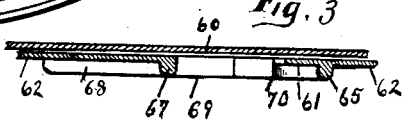

In the drawings, Figure 1 illustrates a front elevation of a scale embodying my invention. Figs. 2 and 3 are respectively partial sectional views of the value-indicator and the exposing-opening in the casing. Fig. 4 is a central vertical section of the scale illustrated in Fig. 1. Fig. 5 is an elevation view of a portion of the casing, illustrating the weight-indicator and its exposing-opening in the casing. Fig. 6 is a central vertical section on line X X in Fig. 4. Figs. 7 and 8 are respectively an elevation and a plan view of the framework of the scale on a reduced scale. Fig. 9 is an elevation of frames 45 and 46 on a reduced scale. Fig. 10 is a cross-section of one of the arms 53, supporting indicating-ring 52. Fig. 11 is an elevation of collar 55 of indicating-ring 52. Fig. 13, Sheet 3, represents respectively an elevation and a plan view of that portion of the draft-bar to which the rack-bar is connected. Fig. 12 is a central vertical section in front elevation of loop 124, and Fig. 14 is an enlarged view of shaft 50 and its supported parts.

10 represents the main frame of the scale, provided centrally on its top with a loop 11, in which is loosely mounted a vertical bolt 12, provided at its top with an enlarged head 13, in which is loosely mounted a ring 14 for conveniently suspending the scale. The lower portion of said bolt 12 is screw-threaded and provided with a loose washer 15, bearing against the under side of said loop 11, and a nut 16, threaded upon bolt 12. Below and in line with said bolt 12 is a vertical bolt 17, passing loosely through an opening in said frame 10 and having its upper end screw-threaded and provided with a nut or adjusting-wheel 18, bearing against the top of said frame 10, between the arms forming said loop 11, as shown in Figs. 1, 4, and 6. The lower end of said bolt 17 is provided with a preferably square head 19, Figs. 4 and 6, and loosely mounted upon said bolt 17 and having a substantially V-shaped projection 20 resting upon said head 19 is a horizontal bar 21, provided with vertical bearings in its opposite ends to receive downwardly-projecting pins 22, rigidly secured to the frame 10. A lug 23 projects downwardly from said bar 21 and is adapted to engage said head 19 for the purpose of preventing the revoluble movement of its bolt 17 when nut 18 is adjusted to slide said bar 21 on said pins 22. Near the opposite ends of said bar 21 are arranged downwardly-projecting hooks 24, adapted to support springs 25, connected at their lower ends to a draft-bar 26, having a rack 27 pivoted thereto by means of a pivot-pin 28, rigidly secured to and projecting from opposite sides of said rack and provided with bearings at its opposite ends in said draft-bar 26, and a plate 29, rigidly secured to said draft-bar, said rack 27 being mounted in a recess 30 in said draft-bar 26, as shown in Fig. 13. In said draft-bar 26 and connecting with said recess 30 is an elongated recess 31, having a flat spring 32 rigidly embedded in one of the end walls of said recess 31 and extending substantially across said recess. Intermediate its ends said spring 32 is adapted to bear against the square lower end of rack 27 for the purpose of at all times holding said rack in mesh with its pinion 33, as hereinafter stated. Directly under the free end of said spring 32 is a pin 34, projecting from the side wall of said recess 31, and is adapted to adjust the tension of said spring 32 during construction by bending said pin 34 up or down to cause said spring 32 to exert greater or less force in bearing against the lower end of said rack 27. The frame 10 in this instance consists of a square housing at the top, from which extend the arms 36, Figs. 4, 6, and 7, which arms are in this instance L-shaped for strength. At about the center of the length of said arms 36 is an integral cross-piece 37, Figs. 4, 6, and 7. Projecting outwardly from each of said arms 36 and about at the center of their length is an arm 38, having lugs 39 projecting from its opposite ends. Formed upon the inner side of said arms 38 and supporting one of said lugs 39 are webs 40.

Connecting the outer ends of arms 38 with the respective ends of the arms 36 are segmental arms 41, Figs. 4, 7, and 8. The lower ends of said arms 36 are connected by an L-shaped segmental arm 42, provided in its center with a slot or recess 43, through which the downward projection of the draft-bar 26 freely passes. From opposite sides of the center of the square housing of said frame 10 project lugs 44, said lugs 44 being of the same height as lugs 39 (see Fig. 8) and having secured to their outer ends frames 45 and 46, Figs. 4, 6, and 9. Said frames 45 and 46 are formed substantially alike and consist of three radial arms 47, Fig. 9. Said arms are integral and unite at a point concentric with the circle formed by said arms 41, at which concentric point in each of said frames 45 and 46 is formed a bearing 48, Figs. 6 and 9, in which is mounted to freely turn the ends 49 of a shaft 50, which ends 49 are of a less diameter than said shaft 50 and are adapted to prevent the lateral movement of said shaft. Substantially at the center of the length of said shaft 50 is loosely mounted a pinion 33, Figs. 4 and 6, meshing with said rack 27, as heretofore described. Said shaft 50 passes freely through an enlarged hole 51, Figs. 6 and 7, in said arm 37. Rigid upon said shaft 50 and directly beneath said frame 46 is an indicating-dial 52, revoluble with said shaft and bearing near its periphery a series of numbered pound and ounce indicating graduations, (see Fig. 5,) said dial 52 being formed of a band or ring connected to said shaft 50 by a series of arms 53, preferably U-shaped in cross-section, Figs. 4 and 10, the latter being secured at one end to said indicating-dial 52 and at their inner ends to U-shaped projections 54, integral with a collar 55, Figs. 6 and 11, rigidly secured to said shaft 50. Concealing said frame 46 is a disk 56, rigid with the casing. In said disk 56 is formed an exposing-opening 57, (Fig. 4, dotted lines,) Figs. 5 and 6, said exposing-opening being formed of an elongated slot in the arc of a circle concentric with said shaft 50, said slot terminating in semicircular ends 58, Fig. 5. Near one end of said exposing-opening 57 and projecting from the lower edge of said opening is a designating arrow-head 59, preferably of a color prominently distinguishable from disk 52 or the indicating characters thereon. Said exposing-opening 57 may, if desirable, be covered by glass, mica, or other suitable transparent substance.

Rigidly mounted upon shaft 50 and immediately beneath the frame 45 is a value-indicating disk 60, Figs. 1 and 6, provided with a series of concentric rows of value-indicating graduations or numbers computed at different rates or prices per unit, and the prices at which said values were computed are arranged upon a plate 61, attached to the face-plate 62 of the casing and upon one edge of the exposing-opening 63 in said plate 62. The outer or left-hand edge in Fig. 1 of said plate 61 is in this instance arranged on a line passing through the center of said indicating-disk 60. The edge of said exposing-opening 63 which is nearest the center of said disk 60 is in this instance formed in the shape of an ogee curve and is designated in Fig. 1 as 64. One end of said edge or bead 64 is connected by a bead 65, parallel with the edge of plate 61, while the remaining end of said edge or bead 64 is connected by an edge or bead 66, which diverges at a slight angle from the edge of said plate 61, said edge or bead 66 being connected by an edge or bead 67, extending substantially parallel with the edge of said plate 61, and connecting with said edge or bead 67 is a U-shaped edge or bead 68, whose outer edge or member 69 forms the outer edge of said exposing-opening 63. The plate 61 extends to within a slight distance of said edge 69, thus leaving an indicating-space of small dimensions between said plate 61 and edge 69, and this corresponding space upon the disk 6 is provided with a series of pound and ounce indicating graduations or numbers, while the surface of said disk 60 indicated by said plate 61 is provided, as before described, with said concentric value-indicating characters, said pound and ounce indicating characters on said disk 60 being designated by an arrow-head 70, projecting from said edge 69, which edge 69 connects with said edge or bead 65, and said edges or beads 64, 65, 66, 67, 68, and 69 being in this instance integral, and the general shape of said exposing-opening 63 as bounded by said edges or beads is substantially L-shaped, with the vertical member of the L substantially radial with reference to the center of said disk 60 and the horizontal member of said L being in this instance in the arc of a circle concentric with said disk 60, and the radial portion of said exposing-opening 63 is of variable width for the special purpose of exposing to view only the proper values, as indicated by the edge of said plate 61 and the next lower numbered value-graduation, which appears adjacent to the edges 66 and 67. This very materially facilitates the reading of the values of sums between the numbered graduations, and in this instance every tenth value-graduation is numbered, except on completing the circuit of the disk the last graduation in each series is given its proper terminating value instead of being numbered as zero or the beginning of said series, as shown in Fig. 1, the values adjacent the serrated edge of said plate 61 being the values which terminate the series of different graduations at the prices shown upon said plate 61, the scale being adjusted to counterbalance ten pounds for each revolution of said disks 52 and 60.

In order to indicate the values indicated above one revolution, the plate 61 is provided with two vertical columns of characters prominently distinguished one from the other by being reproduced in different colors or having a differently-colored background, as shown in Fig. 2. The vertical row of characters adjacent to the edge of said plate 61 indicate the prices at which their corresponding series of concentric rows of value characters were computed, and said price characters being separated from each other by differently-colored lines 71, Fig. 2. The vertical row of characters adjacent to and in horizontal line with said price characters indicate the value of one revolution of the disk 60 at the price designated horizontally in line with said values. Said excess-value-indicating characters are separated from each other by lines 72, which are continuations of said lines 71 and are preferably of a different color. The lines 71 and 72 upon the plate 61 are in line with their corresponding and graduated-value lines upon the movable disk 60, and said lines 71 are also in line with and upon the serrations 73 upon the outer edge of said plate 61. Upon the outer edge of said serrations 73 are formed lines 74 of substantially the same color as lines 71, and said lines 74 and 71 join each other both at the point and the root of each of said serrations 73, the point of each serration indicating and being substantially in line with its corresponding graduated and numbered value-circle upon the disk 60, while the lines 71 and 74, bordering each of said serrations 73, separate the different price-indicating numbers or units and direct attention to the fact that the price indication between said border-lines refers solely to the graduated and numbered value-circle indicated by the point of each serration 73 and that the increased-value-capacity indications upon said plate 61 and horizontally opposite each price unit or number refers to the same series of value characters on disk 60 as does the price unit.

Upon opposite sides of the springs 25 the draft-bar 26 is provided with vertical extensions 90, in which are loosely pivoted one end of connections 91 by pivots 92, and to the remainig ends of said connections 91 are loosely pivoted pistons 93, quite loosely sliding in cylinders 94, mounted in projections 95 of the framework 10 and in the top wall of the housing for said frame 10. Closing the upper end of said pistons 94 are air-tight heads 96, projecting above the surface of the housing for frame 10, Figs. 1, 4, and 6. The pistons 93 are each formed of a hollow shell having at its top a cross-wall 97, from which projects vertically a boss 98, Fig. 4, through which boss is formed a vertical opening having seated therein an air-tight thimble 99, secured to said piston 93 by pin 100, passing through said boss 98 and the top wall of said thimble 99. In the hollow of said thimble 99 is mounted the upper ends of connections 91 by pivots 101, passing loosely through the lateral walls of said thimbles 99 and rigidly carried by said connections 91, so that said pivots 101 bear only in the walls of said thimbles and prevent the connections 91 from engaging the walls of said thimbles in frictional contact.

Upon applying weight to the draft-bar 26 the springs 25 are proportionately expanded, the shaft 50 proportionately revolves by reason of the connection of rack 27 and pinion 33, the respective indicating-disks 52 and 60 are proportionately revolved to indicate both weight and value through their respective exposing-openings 57 and 63, the pistons 93 are proportionately drawn downward in their cylinders 94, permitting a certain quantity of air to pass through the space between the periphery of said pistons 93 and the bore of their cylinders 94 and enter the partial vacuum produced between pistons 93 and the heads 96 of cylinders 94 in such manner as to retard and prevent vibrations of the indicating-disks 52 and 60 and at the same time wholly avoid the inaccuracies of friction, since there is no frictional contact whatsoever between the pistons 93 and their cylinders 94. Upon removing the weight from the draft-bar 26 the above-mentioned parts are caused to return to their normal positions by the contraction of springs 25 and without jar or liability of deranging the parts and their adjustments by reason of pistons 93 compressing the air between said pistons and the heads 96 of said cylinders 94 and causing said compressed air to slowly escape through the passage-way between the peripheries of said pistons 93 and the bore of their cylinders 94.

To prevent the rack 27 from completely unmeshing from the teeth of pinion 33, I provide a projection 102, Fig. 4, rigidly attached to arm 37 of frame 10 and provided with a slot in its forward end, in which the rear edge of said rack 27 seats itself before fully unmeshing from pinion 33, which thus prevents said unmeshing. The spring 32 ordinarily prevents said rack 27 from engaging with said projection 102.

The periphery of the casing is formed of a wall 105, preferably of sheet metal, having a slot 106 in the center of its lower side, through which said draft-bar extends to receive the weighing pan or platform. Said wall 105 extends to and covers a projection 107, extending from the lateral walls of the housing of the frame 10. The wall 105 and the ends 56 and 62 are held in position by means of rings 108, substantially J-shaped in cross-section, Figs. 1, 4, and 6, secured to the casing and framework by means of screws 109, Figs. 1 and 4.

The different sets of value characters upon the disk 60 are each arranged to commence and end with the highest value adapted to be shown by each of said sets, so as to enable the operator to readily observe the value when it is shown by the highest character in each of said sets of value characters and to further enable the operator to read the value when it is greater than is indicated by the proper set of values on said disk. This latter result is obtained as follows: When the operator observes that the highest value indicated by the proper set of value characters is being exposed by the edge of the exposing-opening containing the price-designating characters, he reads the proper excess-value character and adds the same to the amount indicated upon said disk 60.

The supporting of frame 10 loosely upon bolt 12, so as to permit said frame to be turned upon its vertical axis with reference to its supporting-ring 14, enables the operator to turn the scale to accommodate varying lights or to turn the scale so that he can read the large weight-indicating characters upon ring 52 when in uncertain lights or to turn the scale so as to expose either disks 52 or 60 to the customer or proprietor to assure him that the weight is correct or that the price asked is proportionate to the weight. This materially facilitates the adoption and use and convenience of scales of this class.

115, Figs. 4, 7, and 8, represents lugs projecting from opposite sides of frame 10, which lugs 115 project beyond the surface of lugs 39 and 44, and said lugs 115 are adapted to contact with the walls 56 and 62 of the casing to retain said walls in their proper positions.

The pinion 33, loose upon shaft 50, as aforesaid, is rigidly secured to sleeve 120, Figs. 6 and 14, having rigidly secured to its end a collar 121, having rigidly secured thereto two or more oppositely-projecting spring-strips 122, slidably engaged near their outer ends by opposite internal beveled edges 123 of loops 124, rigidly secured to value-indicator 60.

It will be observed from Fig. 14 that sleeve 120 is not adapted to bear against shaft 50 and that pinion 33 and collar 121 alone bear upon said shaft to reduce friction and that said shaft 50 is provided with a reduced portion 125, upon which said collar and pinion bear, and consequently the lateral movement of said pinion and collar are prevented, being confined upon said reduced portion 125 by indicator 60.

The pinion 33 imparts movement to shaft 50 only through the series of spring-strips 122, which form a flexible connection and eliminate the jars and strains occasioned by the sudden starting and stopping of shaft 50, with its rigidly-secured indicating-disks 52 and 60.

The pneumatic cylinders and their pistons form, in effect, a differentially-acting governor in that they permit of a rapid initial movement, which is gradually checked as the movement nears its limit, and it will be particularly noted that the parts are so grouped that the line of draft of the goods-support 26, the line of resistance and draft of the springs, and the line of resistance of the differential governors are coincident, and the action of no one of said elements tends to create a side draft or acts at an angle to any other one. The cylinders of the governor, as well as the springs, are located on diametrically opposite sides of a line (the line of draft) taken vertically through the goods-support and are thus in a single plane, as shown clearly in Fig. 6 of the drawings.

Having now so fully described my invention that others skilled in the art can readily make and use the same when this exclusive grant shall cease to operate, what I claim, and desire to secure by Letters Patent, is—

1. In a computing-scale, the combination of a framework, a casing inclosing said framework, a shaft provided with end bearings in said framework, indicating-disks mounted on said shaft between the bearings, within the framework and adjacent to each side of said casing, the indicating-disk adjacent to one side of said casing being provided with weight-indicating characters and the indicating-disk adjacent the opposite casing being provided with a series of sets of values computed at different rates per unit, exposing-openings in opposite sides of the casing for said indicating-disks, the exposing-opening for the value-indicating disk being provided adjacent to its edge with a series of characters indicating the prices at which the different values on the value-indicating disk were computed, and means for imparting a revoluble movement to said shaft proportionate to the weight of merchandise placed upon said scale, substantially as specified.

2. In a computing-scale, the combination of a framework, a shaft provided on opposite ends with bearings in said framework, indicating-disks mounted adjacent to the opposite ends of said shaft between the bearings and within the framework, one of said disks being provided with weight-indicating characters and the other disk being provided with a series of sets of characters indicating values at different rates per unit, a casing inclosing said framework and disks and shaft, openings at top and bottom in said casing through which the supporting and draft mechanism extend, exposing-openings in opposite sides of said casing for said indicating-disks the exposing-opening for the value-indicating disk being provided adjacent its edge with a series of price-indicating characters corresponding to the prices at which the different values on the value-indicating disk were computed, and means for imparting a revoluble movement to said shaft proportionate to the weight of merchandise placed upon said scale, substantially as specified.

3. In a computing-scale, the combination of a shaft, a frame provided with bearings for said shaft, indicating-disks rigidly mounted upon opposite ends of said shaft, a pinion loosely mounted on said shaft, a rack meshing with said pinion, a collar rigid with said pinion, a series of spring-strips rigidly secured at one end to said collar, a corresponding series of seats rigidly carried by one of said disks and adapted to slidingly engage the free ends of said spring-strips, a casing inclosing said parts, openings at top and bottom in said casing through which the supporting and draft mechanisms extend, exposing-openings in opposite sides of said casing for said indicating-disks, and means for imparting a vertical movement to said rack proportionate to the weight of merchandise placed upon said scale, substantially as specified.

4. In a computing-scale the combination of a revoluble indicating-disk, a series of concentric sets of graduated and numbered values on said disk computed at different rates per unit, a casing for said disk, an exposing-opening in said casing varying in width in accordance with the distance between adjacent numbered graduations on the disk and adapted to expose only the numbered graduation next below the graduation indicating the true value and those graduations intermediate, and a series of price-per-unit characters adjacent one edge of said exposing-opening and adapted to designate the values indicated by said disk, substantially as specified.

5. The combination of a framework, a casing for said framework, an indicator, a draft-bar adapted to move said indicator, connections 91 loosely pivoted to opposite sides of said draft-bar, pistons 93 loosely pivoted to said connections, cylinders 94 supported rigidly in said framework and of a larger diameter than said pistons 93, and a head 96 in one end of said cylinders, substantially as specified.

6. The combination of a framework, an indicator carried by said framework, a draft-bar adapted to move said indicator, connections loosely pivoted to opposite sides of said draft-bar and to thimbles 99, secured to pistons 93 by pins 100 passing through said thimbles and through projections 98 of said pistons, cylinders 94 rigid in said framework and of larger diameter than and receiving said pistons, and heads 96 for and closing one end of said cylinders, substantially as specified.

7. In a spring-balance, the combination of a spring-supported draft-bar, a revoluble shaft, an indicator driven by said shaft, a pinion on said shaft, a rack carried by said draft-bar and meshing with said pinion, a pivot 28 connecting said rack-bar to said draft-bar and a plate 29 rigid with said draft-bar, and a spring-strip 32 supported at each end by said draft-bar and engaging the lower edge of said rack to retain the same in mesh with said pinion, substantially as specified.

8. The combination of an indicating-ring 52 having indicating characters upon its face, a series of arms 53 substantially U shape in cross-section connecting said ring with projections 54 of collar 55, a revoluble shaft supporting and driving said collar, a casing for said ring, and an exposing-opening in said casing for said ring, substantially as specified.

9. The combination of a frame 10, a wall 105 about its periphery, end walls 56 and 62, rings 108 substantially J shape in cross-section upon each edge of said wall 105 and securing and concealing the edges of said walls 56 and 62, said rings 108 being secured to said walls 105 and to said frame 10 substantially as specified.

10. The combination of a frame, a threaded nut 18 exposed upon said frame and supporting bolt 17 having head 19 supporting bar 21, a projection 20 forming the bearing between said bar 21 and head 19, a projection 23 of bar 21, engaging head 19, guides 22 rigid with said frame and provided with bearings in said bar 21, springs 25 supported by said bar 21, a draft-bar supported by said springs, a revoluble shaft supported by said frame, an indicator driven by said shaft, and a rack-and-pinion connection between said shaft and draft-bar, substantially as specified.

11. The combination of a shaft mounted in suitable bearings, an indicating-disk rigidly secured to and near each end of said shaft, a pinion loosely mounted on said shaft, a series of radial spring-strips rigid with and radiating from said pinion, a corresponding series of loops rigid upon one of said indicators, V-shaped edges in said loops adapted to engage the ends of said spring-strips, indicating characters upon said indicating-disks, a casing inclosing said parts, exposing-openings in said casing for designating said characters, and means for imparting a revoluble movement to said pinion proportionate to the weight of merchandise, substantially as specified.

12. In a spring-balance scale the combination with the frame or casing, the longitudinally-movable goods-support and the supporting-springs connecting said support and casing and arranged on diametrically opposite sides of the center of the line of draft of the goods-support, of pneumatic cylinders having their lower ends open and arranged with the line of their longitudinal centers in the same plane as the longitudinal centers of the supporting-springs, pistons working in said cylinders and piston-rods directly connecting the pistons with the goods-support and having their lines of draft in the plane of the longitudinal centers of the springs and cylinders, whereby the action of the springs and cylinders and pistons does not deflect the goods-support from its line of draft when the goods are applied to or removed therefrom.

13. In a spring-balance scale, a casing and a rotary indicator combined with a freely-suspended goods-support, a rack-bar interposed between the goods-support and indicator, springs connecting the goods-support and casing and a pneumatic differential governor interposed between the goods-support and casing, said goods-support, rack-bar, springs and pneumatic differential governor, all having their longitudinal axes and lines of draft in a single coincident plane and so arranged that the resultant resistance of each is in a line coinciding with that of each of the others; substantially as described.

14. In a spring-balance scale, a casing having a single point of suspension at top and a rotary indicator journaled in the casing, combined with a freely-suspended goods-support, a rack-bar, interposed between the goods-support and indicator, springs connecting the goods-support and casing and a pneumatic differential governor interposed between the goods-support and casing, said casing-support, goods-support, rack-bar, springs and pneumatic differential governor all having their longitudinal axes and lines of draft in a single coincident plane and so arranged that the resultant resistance of each is in a line coinciding with that of each of the others, substantially as described.

15. In a spring-balance scale, the combination of the scale-frame, a vertically-movable spring-suspended runner having on its lower end means for attaching the load, a horizontal spindle mounted on the frame above the runner, a pinion on the spindle, and a rack connected with the runner and engaging with said pinion, with two vertical dash-pot cylinders supported by the frame and lying on opposite sides of the spindle with their axes in the same vertical plane (at right angles to the spindle) in which the runner lies and moves, plungers freely movable in said dash-pots, and rods which are connected with said plungers and parts of the runner which are in line with the axes of the dash-pot cylinders.

ORANGE O. OZIAS.

Witnesses:
EDWARD CANBY,
CHARLES W. JAMES.